United States Patent
Nacer et al.

(10) Patent No.: US 10,021,648 B2
(45) Date of Patent: Jul. 10, 2018

(54) WIRELESS DEVICE TRANSFER TO A POWER SAVING MODE

(71) Applicant: Verizon Patent and Licensing Inc., Arlington, VA (US)

(72) Inventors: Jeremy Nacer, Morris Plains, NJ (US); Siva Sandeep Dhandu, Princeton, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/197,075

(22) Filed: Jun. 29, 2016

(65) Prior Publication Data

US 2018/0007630 A1   Jan. 4, 2018

(51) Int. Cl.
| | |
|---|---|
| H04W 76/00 | (2018.01) |
| H04W 52/02 | (2009.01) |
| H04W 28/02 | (2009.01) |
| H04W 76/30 | (2018.01) |

(52) U.S. Cl.
CPC ... H04W 52/0235 (2013.01); H04W 28/0252 (2013.01); H04W 76/30 (2018.02)

(58) Field of Classification Search
USPC ...... 455/343.1, 343.2, 522, 343.5, 405, 574, 455/422.1
See application file for complete search history.

(56) References Cited

U.S. PATENT DOCUMENTS

| | | | | |
|---|---|---|---|---|
| 2011/0069649 | A1* | 3/2011 | Gobriel | H04W 52/0232 370/311 |
| 2013/0155964 | A1* | 6/2013 | Miller | H04L 47/724 370/329 |
| 2014/0022909 | A1* | 1/2014 | Mahmoud | H04W 76/048 370/241 |
| 2015/0296499 | A1* | 10/2015 | Huang | H04W 72/048 370/329 |
| 2015/0327167 | A1* | 11/2015 | Ljung | H04W 76/068 370/311 |
| 2015/0334656 | A1* | 11/2015 | Ji | H04W 52/0245 370/252 |
| 2015/0341241 | A1* | 11/2015 | Robertson | H04L 43/0811 709/224 |
| 2017/0064579 | A1* | 3/2017 | Park | H04W 28/0268 |
| 2017/0192402 | A1* | 7/2017 | Karp | G05B 17/02 |

OTHER PUBLICATIONS

Gibbs, "LTE Cat-0's Power Saving Mode: What it Could Mean for Cellular IoT," http://www.eleven-x.com/2015/04/29/lte-cat-0s-power-saving-mode-what-it-could-mean-for-cellular-iot/, Apr. 29, 2015, 4 pages.

* cited by examiner

*Primary Examiner* — Ganiyu A Hanidu (57) ABSTRACT

A device may determine that a transmission of network traffic, associated with a wireless device, is complete. The transmission of network traffic may be between the wireless device and a base station associated with a network. The device may transmit a request to disconnect from the network based on determining that the transmission of network traffic is complete. The device may transfer the wireless device to the power saving mode based on receiving a response, to the request, that grants permission to disconnect from the network. The power saving mode being associated with one or more components of the wireless device being shut down.

20 Claims, 8 Drawing Sheets

WIRELESS DEVICE TRANSFER TO A POWER SAVING MODE

BACKGROUND

A wireless device may utilize one or more power saving techniques to allow the wireless device to reduce power consumption. For example, a particular wireless device (e.g., an Internet of Things device or a user device) may enter a power saving mode, which may result in one or more components of the wireless device being shut down, thereby reducing power consumption relative to when the wireless device is transmitting data and conserving battery life. The particular wireless device may wait for a network device (e.g., a base station) to determine that a threshold period of time has elapsed from completion of a data transmission before being disconnected from a network and entering the power saving mode, thereby ensuring that the data transmission is not interrupted.

DETAILED DESCRIPTION OF PREFERRED EMBODIMENTS

The following detailed description of example implementations refers to the accompanying drawings. The same reference numbers in different drawings may identify the same or similar elements.

When a wireless device (e.g., an Internet of Things (IoT) device or a user device, a sensor, a machine to machine (M2M) communication device, or a control device) transmits data via a network, the wireless device may utilize a large amount of power relative to when the wireless device is not transmitting data. The wireless device may utilize one or more power saving techniques to reduce power consumption. For example, the wireless device may shut down one or more components of the wireless device when the wireless device is not connected to a network. After a transmission of network traffic is complete, the wireless device may wait for a network device (e.g., a base station, a transmitter, a network management device, or a processor) to determine that a threshold period of inactivity time (e.g., five seconds, eight seconds, ten seconds, or another amount of time) has elapsed before the wireless device enters a power saving mode. In this way, the base station avoids disconnecting the wireless device from a network before the transmission of network traffic is complete.

During the threshold period of inactivity time, the wireless device may remain connected to the network via the base station, and may utilize a large amount of power relative to when the wireless device is in a power saving mode with one or more components shut down. After the threshold period of inactivity time has elapsed, the wireless device may transfer to the power saving mode, and may be associated with a lesser rate of power consumption than during the threshold period of inactivity time or when transmitting data. However, power consumption during threshold period of inactivity time may reduce power resources for the wireless device, thereby negatively impacting user experience, wireless device performance, or the like.

Implementations, described herein, may cause the wireless device to determine that a transmission of network traffic is complete and transfer to a power saving mode without requiring a threshold period of inactivity time to expire. As a result, power consumption by the wireless device is improved relative to the wireless device waiting for the threshold period of inactivity time to transfer to the power saving mode. For example, based on transferring to the power saving mode without requiring the threshold period of inactivity time to expire, implementations, described herein, may double a lifetime of the power resources of the wireless device.

Figure 1:
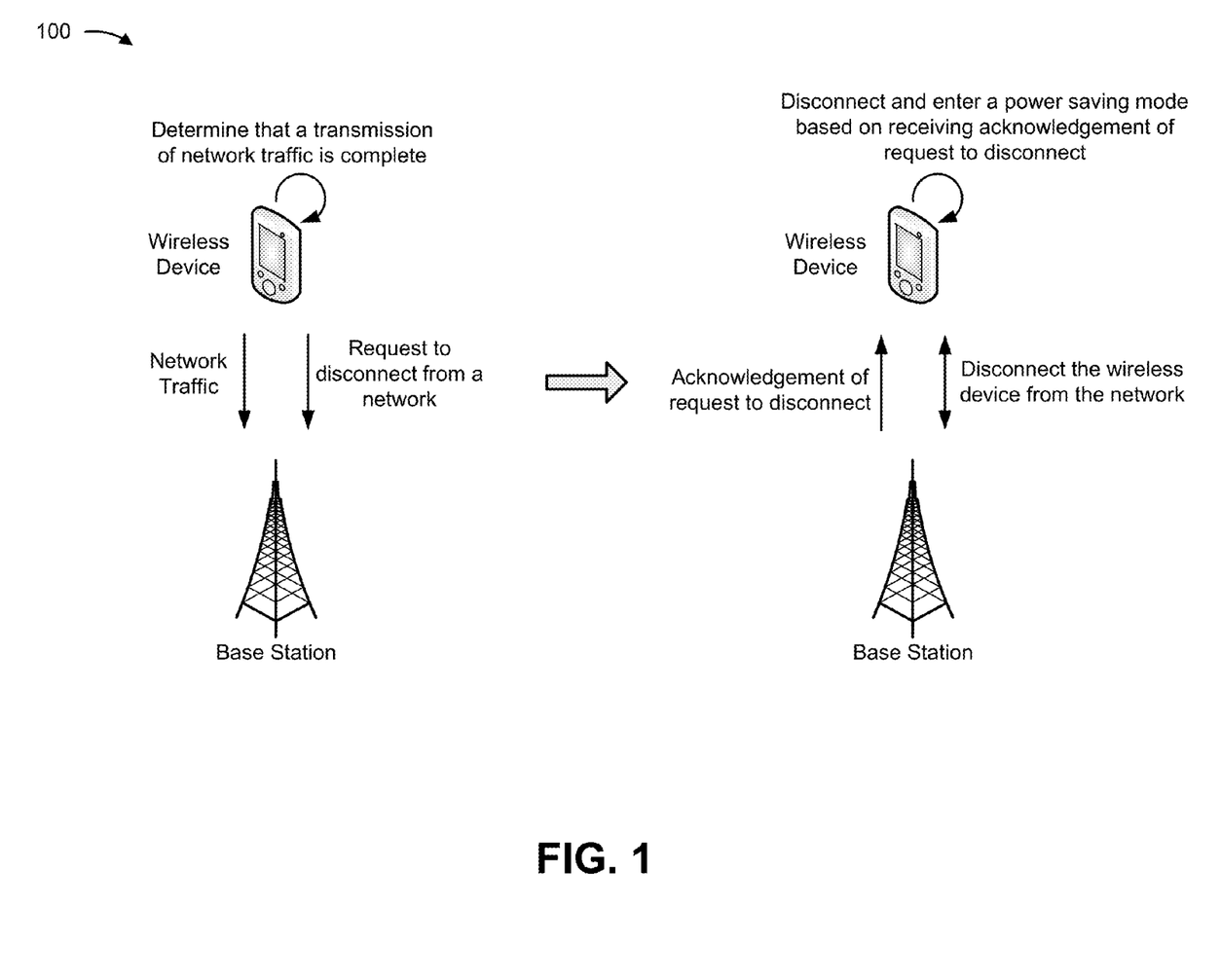
FIG. 1 is a diagram of an overview of an example implementation described herein.

FIG. 1 is a diagram of an overview of an example implementation 100 described herein. As shown in FIG. 1, example implementation 100 may include a wireless device and a base station.

As further shown in FIG. 1, the wireless device may transmit data to the base station. For example, when the wireless device is a location tracking wireless device, the wireless device may transmit a set of location reports identifying a location of the wireless device based on determining the location of the wireless device. Additionally, or alternatively, when the wireless device is a sensor device, the wireless device may transmit a set of monitoring reports identifying sensor data. After transmitting data to the base station, the wireless device may determine that a particular transmission of network traffic is complete. For example, when the wireless device is a location tracking wireless device and the wireless device has provided information identifying a location (e.g., via a set of packets), the wireless device may determine that transmission of network traffic is complete. Similarly, when the wireless device is to provide a threshold quantity of monitoring reports each day, the wireless device may determine that transmission of network traffic is complete for the day after transmitting the threshold quantity of monitoring reports. Based on determining that the transmission of network traffic is complete, the wireless device may send a request to the base station to disconnect from a network.

Based on receiving the request from the wireless device to disconnect from the network, the base station (or another network device associated with a network, such as a network management device or a network controller) may determine, in the base station or in the network, that the request from the wireless device to disconnect from the network is valid. For example, the base station may transmit information identifying the wireless device (e.g., to a mobility management entity (MME)), and may receive response information indicating that the wireless device is configured and/or permitted to enter a power saving mode without requiring a threshold period of inactivity time to expire. In this way, a network operator may integrate the wireless device into a network that includes legacy network devices, some of which are not configured to permit a wireless device to enter a power saving mode without requiring a threshold period of inactivity time to expire.

As further shown in FIG. 1, the wireless device may receive, from the base station, an acknowledgement of the request to disconnect from the network. Based on receiving the acknowledgement of the request to disconnect from the network, the wireless device may disconnect from the network and enter the power saving mode. For example, the wireless device may shut down one or more components, such as a transmitter component, a receiver component, a transceiver component, an antenna component, or the like, thereby reducing a rate of power consumption relative to when the wireless device is in another mode (e.g., an active mode or an idle mode).

In another example, one or more network devices, such as the base station, an MME, a packet data network gateway (PGW), a serving gateway (SGW), or the like may exchange a set of signaling messages based on the wireless device disconnecting from the network and entering the power saving mode. For example, the one or more network devices may cause the base station to release a context (e.g., a user equipment (UE) context) associated with the wireless device based on permitting the wireless device to disconnect from the network and enter the power saving mode. Similarly, the MME and the PGW may cause a bearer to be removed and/or reallocated based on permitting the wireless device to disconnect from the network and enter the power saving mode. This may improve operations of the network by freeing up resources for communications with other wireless devices.

After disconnecting from the network and entering the power saving mode, the wireless device may determine that the wireless devices is to exit the power saving mode and transmit data. For example, the wireless device may determine that a threshold period of time associated with transmitting a location report is expired, and may exit the power saving mode and reconnect to the network to transmit the location report.

In this way, the wireless device transfers to a power saving mode without requiring a threshold period of inactivity time to expire, thereby reducing a rate of power consumption relative to when waiting for the threshold period of inactivity time to expire. Moreover, based on reducing a rate of power consumption, the wireless device reduces heat dissipation, which improves system stability and longevity, and energy use, which reduces operating and maintenance costs.

As indicated above, FIG. 1 is provided merely as an example. Other examples are possible and may differ from what was described with regard to FIG. 1.

Figure 2:
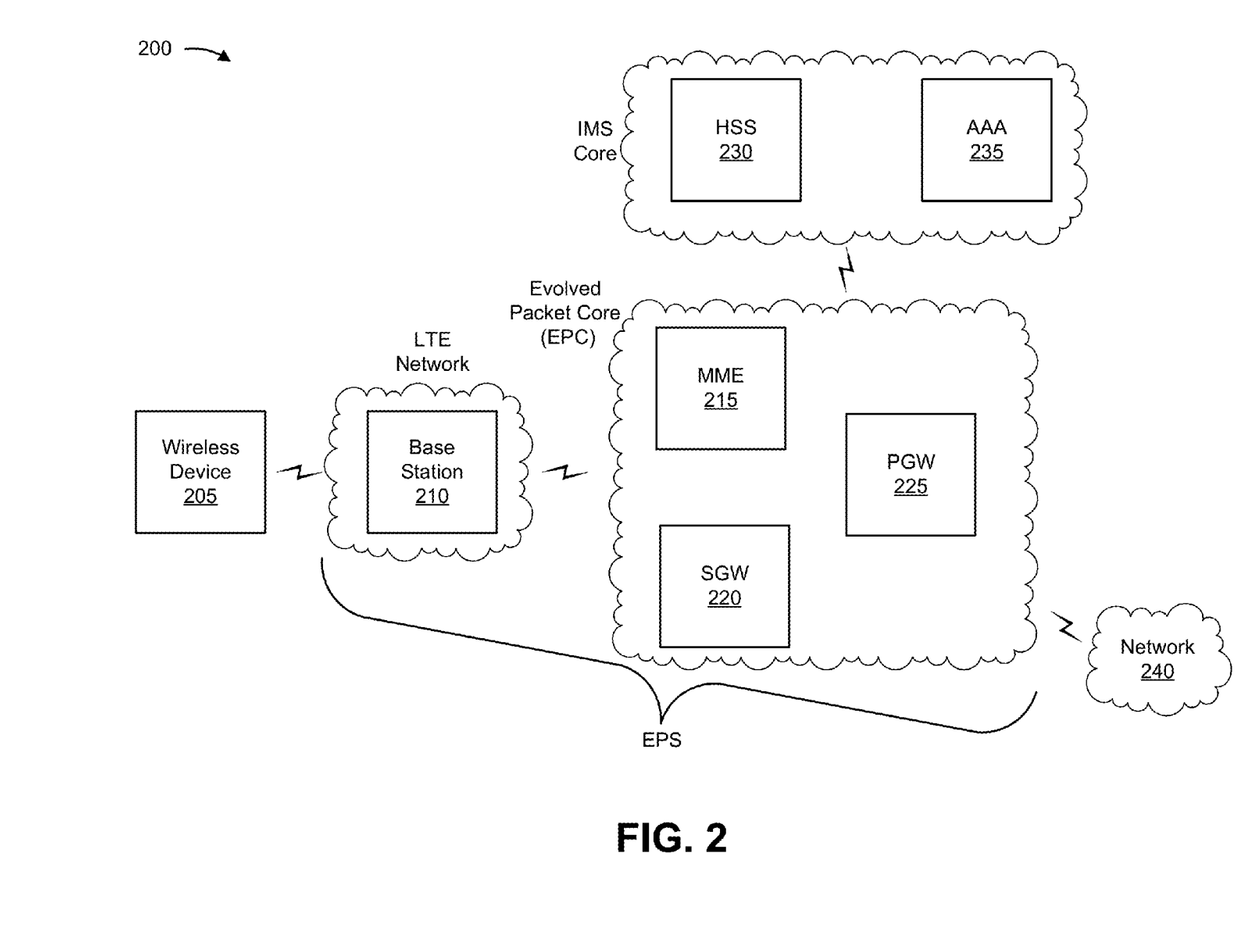
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a wireless device 205; a base station 210; an MME 215; an SGW 220; a PGW 225; a home subscriber server (HSS) 230; an authentication, authorization, and accounting server (AAA) 235; and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a third generation (3G) network, a fourth generation (4G) network, a fifth generation (5G) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which wireless device 205 communicates with the EPC. The EPC may include MME 215, SGW 220, and/or PGW 225 that enable wireless device 205 to communicate with network 240 and/or an Internet protocol (IP) multimedia subsystem (IMS) core. The IMS core may include HSS 230 and/or AAA 235, and may manage device registration and authentication, session initiation, etc., associated with mobile devices 205. HSS 230 and/or AAA 235 may reside in the EPC and/or the IMS core.

Wireless device 205 includes one or more devices capable of communicating with base station 210 and/or a network (e.g., network 240). For example, wireless device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Additionally, or alternatively, wireless device 205 may include an Internet of Things device, a machine device, or the like, such as a network-connected parking meter, a network-connected heart monitoring implant, a smart refrigerator, a location tracking device, or the like. Wireless device 205 may send traffic to and/or receive traffic from network 240 (e.g., via base station 210, SGW 220, and/or PGW 225). In some implementations, wireless device 205 may operate in one or more modes, such as an active mode (e.g., a mode where wireless device 205 is configured to transmit or receive data), a power saving mode (e.g., a mode where wireless device 205 has shut down one or more components), or the like.

Base station 210 includes one or more devices capable of transferring traffic, such as audio, video, text, and/or other traffic, destined for and/or received from wireless device 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from wireless device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with wireless device 205. In some implementations, MME 215 may perform operations relating to authentication of wireless device 205. Additionally, or alternatively, MME 215 may facilitate the selection of a particular SGW 220 and/or a particular PGW 225 to serve traffic to and/or from wireless device 205. MME 215 may perform operations associated with handing off wireless device 205 from a first base station 210 to a second base station 210 when wireless device 205 is transitioning from a first cell associated with the first base station 210 to a second cell associated with the second base station 210. Additionally, or alternatively, MME 215 may select another MME (not pictured), to which wireless device 205 should be handed off (e.g., when wireless device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to wireless device 205 via base station 210. Additionally, or alternatively, SGW 220 may perform operations associated with handing off wireless device 205 to and/or from an LTE network.

PGW 225 includes one or more devices capable of providing connectivity for wireless device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to wireless device 205 via SGW 220 and base station 210. PGW 225 may record data usage information (e.g., byte usage), and may provide the data usage information to AAA 235.

HSS 230 includes one or more devices, such as one or more server devices, capable of managing (e.g., receiving, generating, storing, processing, and/or providing) information associated with wireless device 205. For example, HSS 230 may manage subscription information associated with wireless device 205, such as information that identifies a subscriber profile of a user associated with wireless device 205, information that identifies services and/or applications that are accessible to wireless device 205, location information associated with wireless device 205, a network identifier (e.g., a network address) that identifies wireless device 205, information that identifies a treatment of wireless device 205 (e.g., quality of service information, a quantity of minutes allowed per time period, a quantity of data consumption allowed per time period, etc.), and/or similar information. In some implementations, HSS 230 may store information indicating that wireless device 205 is permitted to transfer to power saving mode without requiring a threshold period of inactivity time to expire. HSS 230 may provide this information to one or more other devices of environment 200 to support the operations performed by those devices.

AAA 235 includes one or more devices, such as one or more server devices, that perform authentication, authorization, and/or accounting operations for communication sessions associated with wireless device 205. For example, AAA 235 may perform authentication operations for wireless device 205 and/or a user of wireless device 205 (e.g., using one or more credentials), may control access, by wireless device 205, to a service and/or an application (e.g., based on one or more restrictions, such as time-of-day restrictions, location restrictions, single or multiple access restrictions, read/write restrictions, etc.), may track resources consumed by wireless device 205 (e.g., a quantity of voice minutes consumed, a quantity of data consumed, etc.), and/or may perform similar operations.

Network 240 includes one or more wired and/or wireless networks. For example, network 240 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
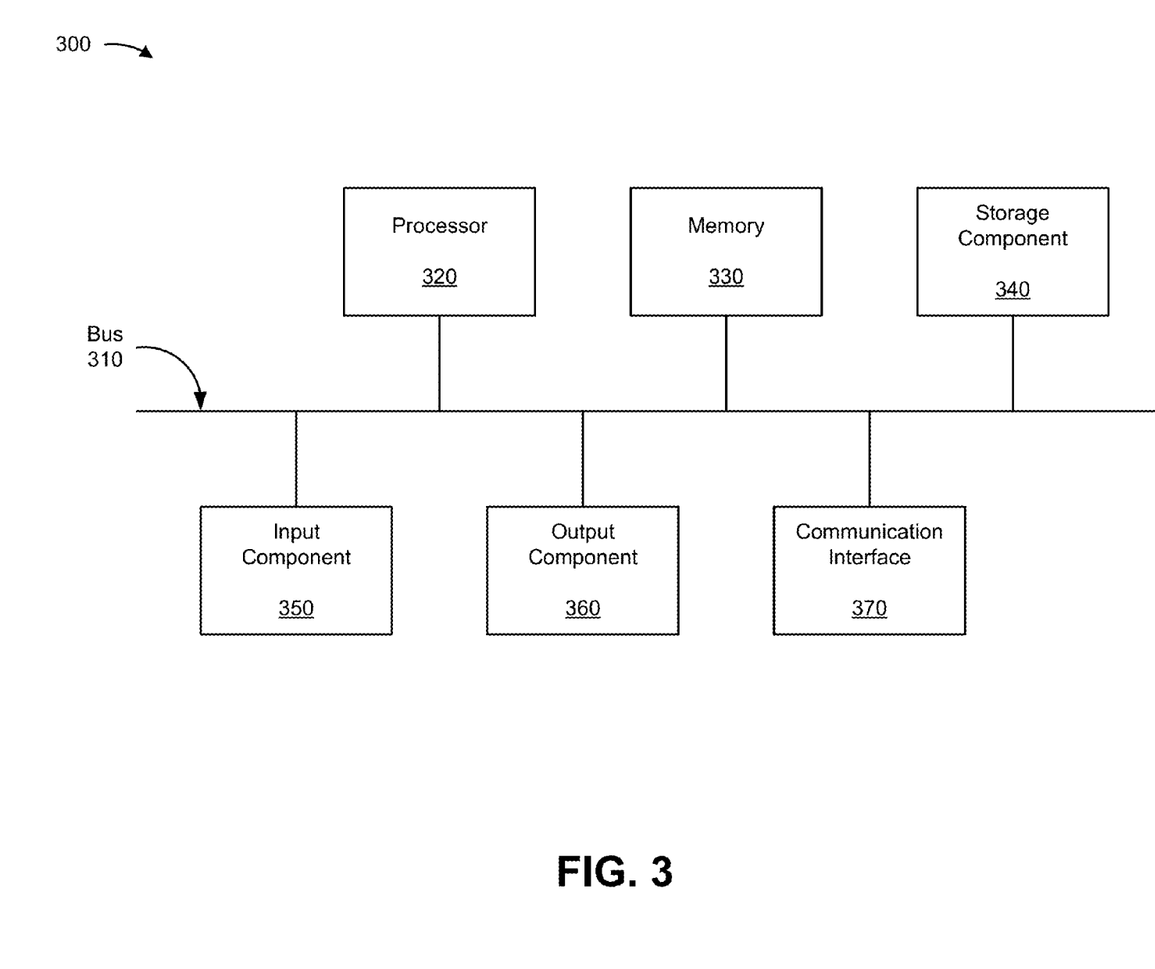
FIG. 3 is a diagram of example components of one or more devices of FIG. 2.

FIG. 3 is a diagram of example components of a device 300. Device 300 may correspond to wireless device 205, a base station 210, MME 215, SGW 220, PGW 225, HSS 230, and/or AAA 235. In some implementations, wireless device 205, a base station 210, MME 215, SGW 220, PGW 225, HSS 230, and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
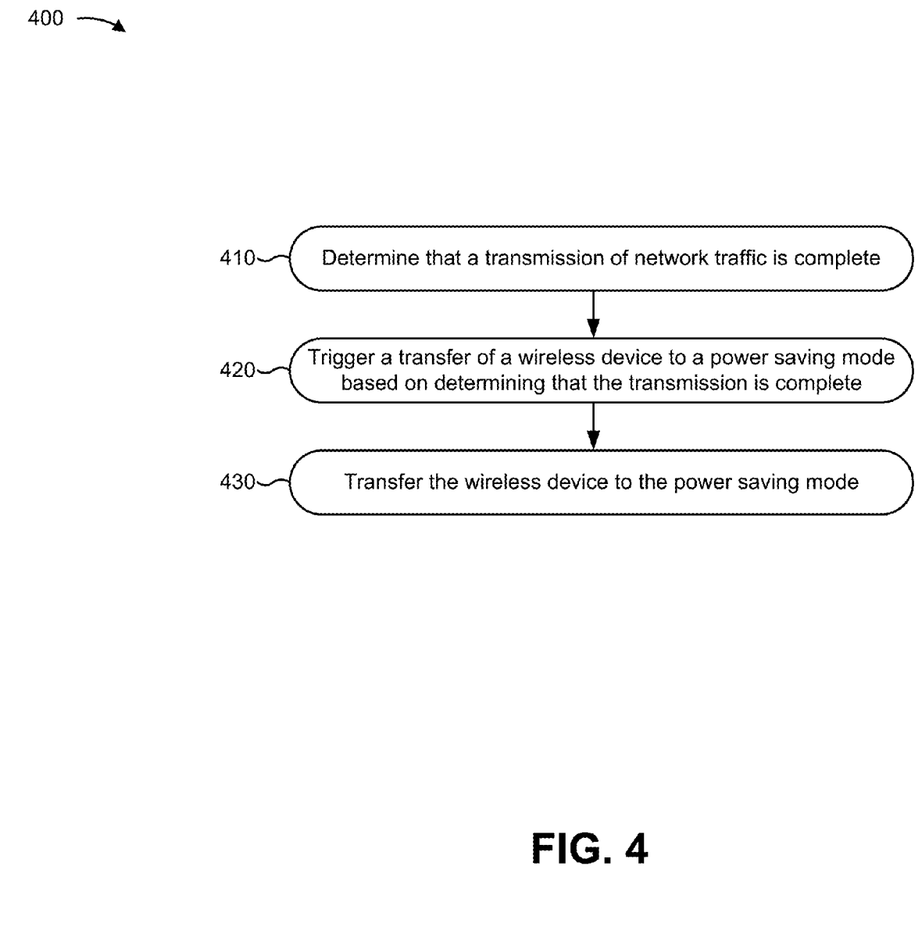
FIG. 4 is a flow chart of an example process for transferring a wireless device to a power saving mode.

FIG. 4 is a flow chart of an example process 400 of transferring wireless device 205 to a power saving mode. In some implementations, one or more process blocks of FIG. 4 may be performed by wireless device 205. In some implementations, one or more process blocks of FIG. 4 may be performed by another device or a group of devices separate from or including wireless device 205, such as base station 210, MME 215, SGW 220, PGW 225, HSS 230, and/or AAA 235.

As shown in FIG. 4, process 400 may include determining that a transmission of network traffic is complete (block 410). For example, wireless device 205 may determine that the transmission of network traffic is complete. Network traffic may refer to information transmitted by wireless device 205 to base station 210 and/or information received by wireless device 205 from base station 210. For example, wireless device 205 may transmit and/or receive sensor information obtained from a sensor of wireless device 205, such as location information, temperature information, status information, alarm information, or the like. In this case, when wireless device 205 is associated with performing location tracking, wireless device 205 may transmit information regarding a location of wireless device 205, and may determine that the transmission of network traffic is complete based on transmitting the information regarding the location.

In some implementations, wireless device 205 may transmit and/or receive signaling information. For example, when wireless device 205 transfers from a first cell to a second cell, wireless device 205 may transmit a set of signaling messages to base station 210 to request an update of a tracking area, and may determine that the transmission of network traffic is complete after receiving a tracking area update accept message from base station 210. In some implementations, wireless device 205 may transmit and/or receive communication information, such as voice information, text information, video information, or the like. For example, when wireless device 205 detects a user interaction with a user interface associated with indicating that wireless device 205 is to send a text message, wireless device 205 may transmit a text message toward base station 210 for routing toward another wireless device 205. In this case, wireless device 205 may determine that the transmission of network traffic is complete after transmitting the text message.

In some implementations, wireless device 205 may transmit data periodically, and may determine that the transmission of network traffic is complete based on transmitting data periodically. For example, when wireless device 205 is associated with providing information identifying a location on a periodic basis (e.g., once per hour, once per day, or once per week), wireless device 205 may determine that the transmission of network traffic is complete for a period of time based on providing the information identifying the location. Additionally, or alternatively, wireless device 205 may transmit data based on obtaining the data. For example, when wireless device 205 obtains sensor data from a sensor, wireless device 205 may transmit information identifying the sensor data, and may determine that the transmission of network traffic is complete after transmitting the information identifying the sensor data. Similarly, when wireless device 205 determines that the sensor data (e.g., temperature data, humidity data, or heart rate data) fails to satisfy a threshold value, wireless device 205 may determine that data is not to be transmitted, and may determine that the transmission of network traffic is complete until the sensor data satisfies the threshold value. In this way, wireless device 205 may reduce a utilization of processing resources and/or energy consumption relative to transmitting the sensor data that is received.

In some implementations, wireless device 205 may determine that a transmission of network traffic is complete based on a user interaction with a user interface. For example, when wireless device 205 detects a user interaction with user interface, wireless device 205 may determine that the user interaction is associated with causing wireless device 205 to disconnect from a network and wireless device 205 may determine that the transmission of network traffic is complete. Similarly, when wireless device 205 detects a user interaction associated with causing a communication application to be shut down, wireless device 205 may determine that a transmission of network traffic associated with the communication application is complete.

In some implementations, wireless device 205 may determine that a transmission of network traffic is complete based on information associated with the transmission of network traffic. For example, wireless device 205 may generate a set of packets to provide a location report for storage via an application server and may store information identifying a quantity of packets in the set of packets. In this case, wireless device 205 may determine that the transmission of network traffic is complete after determining that the quantity of packets has been transmitted.

In some implementations, wireless device 205 may determine that the transmission of network traffic is complete based on receiving an indication that the transmission of network traffic is complete. For example, wireless device 205 may receive, from a control server associated with controlling collection of sensor data by wireless device 205, information indicating that wireless device 205 is to cease collection and/or transmission of sensor data for a threshold period of time.

In some implementations, wireless device 205 may determine that a transmission of network traffic is complete based on time information. For example, when wireless device 205 is to transmit information for a particular period of time (e.g., from 1:00 AM to 4:00 AM each day) to reduce a load on a network relative to transmitting information at any time, wireless device 205 may determine that the transmission of network traffic is complete after the particular period of time is expired.

In some implementations, wireless device 205 may determine that a transmission of network traffic is complete based on satisfying a threshold related to a data cap. For example, wireless device 205 may determine that the transmission of network traffic satisfies a data cap threshold, and may determine that the transmission of network traffic is complete based on the transmission of network traffic satisfying the data cap threshold.

As further shown in FIG. 4, process 400 may include triggering a transfer of a wireless device to a power saving mode based on determining that the transmission of network traffic is complete (block 420). For example, wireless device 205 may trigger the transfer of wireless device 205 to the power saving mode based on determining that the transmission of network traffic is complete. A power saving mode may refer to a mode in which one or more components of wireless device 205 are shut down to reduce a consumption of power by wireless device 205. For example, when wireless device 205 is in the power saving mode, wireless device 205 may not use a transmitter, a processor, a digital to analog converter, a receiver, a modem, or the like, thereby reducing a rate of power consumption relative to when wireless device 205 is not in the power saving mode and is transmitting data or when wireless device 205 is waiting for a threshold period of inactivity time to expire.

In some implementations, wireless device 205 may not be in the power saving mode when wireless device 205 triggers the transfer of wireless device 205 to the power saving mode. For example, wireless device 205 may be in a connected mode, an active mode, an idle mode, or the like when wireless device 205 triggers the transfer of wireless device 205 to the power saving mode. In this case, wireless device 205 may be in a connected mode to transmit information to base station 210 when wireless device 205 triggers the transfer of wireless device 205 to the power saving mode.

In some implementations, wireless device 205 may transmit information to base station 210 to trigger the transfer to the power saving mode. For example, wireless device 205, based on determining that the transmission of network traffic is complete, may transmit a message to base station 210 to cause wireless device 205 to be disconnected from a network within an inactivity timer value (e.g., less than approximately eight seconds or value for the inactivity timer) of determining that the transmission of network traffic is complete. In this case, based on transmitting the request, wireless device 205 may cause base station 210 to release a UE context associated with wireless device 205, to remove a radio resource control (RRC) connection associated with wireless device 205, to reallocate a set of radio bearers allocated to wireless device 205, or the like.

Additionally, or alternatively, wireless device 205 may transmit a message to base station 210 to request permission to transfer to the power saving mode. For example, wireless device 205 may transmit a message to base station 210 to cause base station 210 to obtain validation information from MME 215 and/or HSS 230 indicating that wireless device 205 is permitted to be disconnected from the network to enter the power saving mode without a threshold period of inactivity time elapsing. In this case, base station 210 may provide information identifying wireless device 205 to MME 215, may receive confirmation that wireless device 205 may transfer to the power saving mode, and may transmit information to wireless device 205 indicating that wireless device 205 is permitted to transfer to the power saving mode. In some implementations, MME 215 may obtain information from HSS 230 indicating that wireless device 205 is permitted to ignore the inactivity timer, and may provide information to base station 210 to cause base station 210 to provide permission to wireless device 205 to ignore the inactivity timer. In this way, wireless device 205 may transfer to the power saving mode without a threshold period of inactivity time elapsing. In some implementations, MME 215 may obtain information from HSS 230 indicating that wireless device 205 is authorized to transfer to the power saving mode, and may provide the information to base station 210 to cause base station 210 to provide permission to wireless device 205 to transfer to the power saving mode. In this way, a network operator may integrate the wireless device into a network that includes legacy network devices, some of which are not configured to permit a wireless device to enter a power saving mode without requiring a threshold period of inactivity time to expire.

As further shown in FIG. 4, process 400 may include transferring the wireless device to the power saving mode (block 430). For example, wireless device 205 may transfer wireless device 205 to the power saving mode. In some implementations, wireless device 205 may disconnect from base station 210 to transfer to the power saving mode. For example, wireless device 205 may disconnect from base station 210 based on receiving permission to disconnect. Based on disconnecting from base station 210 or based on receiving the permission to disconnect, wireless device 205 may interpret the disconnect or the permission as an instruction to enter the power saving mode, and may transfer to the power saving mode without requiring a threshold period of inactivity time to expire, thereby reducing a power consumption of wireless device 205 relative to remaining in another mode during the threshold period of inactivity time. Furthermore, transferring to the power saving mode without requiring the threshold period of inactivity time to expire may double a lifetime of the power resources of wireless device 205, as described herein. In some implementations, wireless device 205 may shut down one or more components of wireless device 205 to transfer wireless device 205 to the power saving mode. For example, wireless device 205 may deactivate a transmitter, a digital to analog converter, a processor, a modem, a receiver, a transceiver, or the like, thereby reducing a power consumption of wireless device 205.

In some implementations, base station 210 may cause wireless device 205 to disconnect and transfer to the power saving mode. For example, based on wireless device 205 triggering the transfer to power saving mode by transmitting a request to base station 210, base station 210 may transmit signaling information to wireless device 205 to disconnect and transfer wireless device 205 to the power saving mode. In this case, wireless device 205 may disconnect and transfer to the power saving mode, thereby reducing a power consumption of wireless device 205. In some implementations, the signaling information may identify a component that is to be shut down, an amount of time that wireless device 205 is to remain in the power saving mode, or the like.

In some implementations, wireless device 205 may transfer to the power saving mode, and may remain in the power saving mode for a threshold period of time. For example, wireless device 205 may transfer to the power saving mode, and remain in the power saving mode for an hour, a day, a week, or the like based on stored information identifying the threshold period of time. Additionally, or alternatively, wireless device 205 may remain in the power saving mode until one or more criteria are satisfied (e.g., a threshold temperature is identified based on sensor data, a threshold altitude is satisfied based on sensor data, or a threshold heart rate is identified based on sensor data). For example, wireless device 205 may transfer to the power saving mode when at a particular location, and may remain in the power saving mode until wireless device 205 determines that wireless device 205 satisfies a threshold distance from the particular location.

In some implementations, wireless device 205 may detect a trigger to exit the power saving mode after transferring to the power saving mode, and may transfer from the power saving mode. For example, wireless device 205 may determine that wireless device 205 satisfies a threshold distance from a particular location, and may determine to transmit a location report. In this case, wireless device 205 may activate one or more components of wireless device 205 and may communicate with base station 210 to reconnect to the network. In this way, wireless device 205 reduces a consumption of power during a period when wireless device 205 is not transmitting data relative to requiring a threshold period of inactivity time to elapse before entering the power saving mode. Moreover, wireless device 205 exits the power saving mode when wireless device 205 is caused to transmit information, thereby maintaining a user experience relative to remaining in the power saving mode until an instruction is received from base station 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
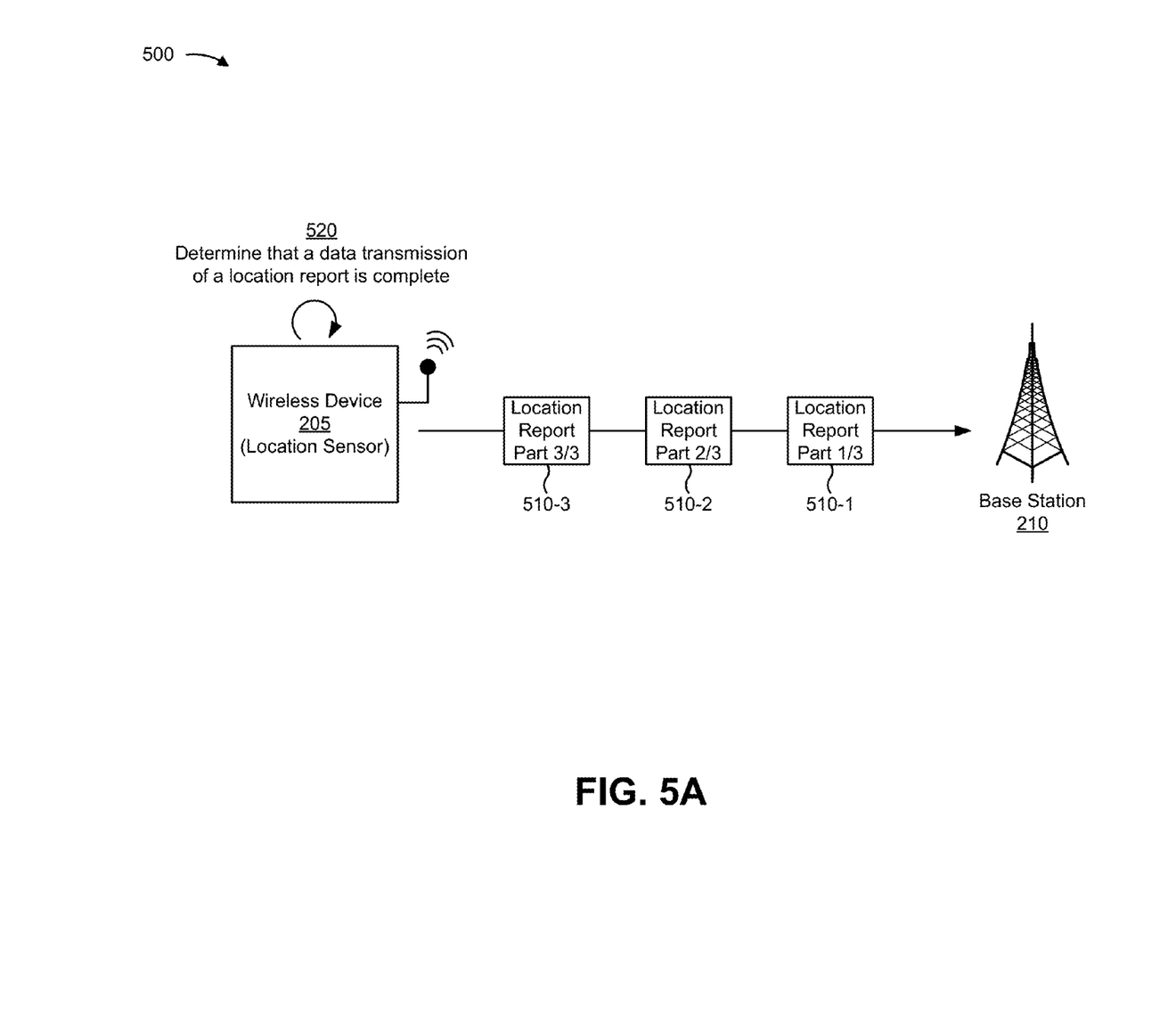
FIGS. 5A-5C are diagrams of an example implementation relating to the example process shown in FIG. 4.
Figure 5B:
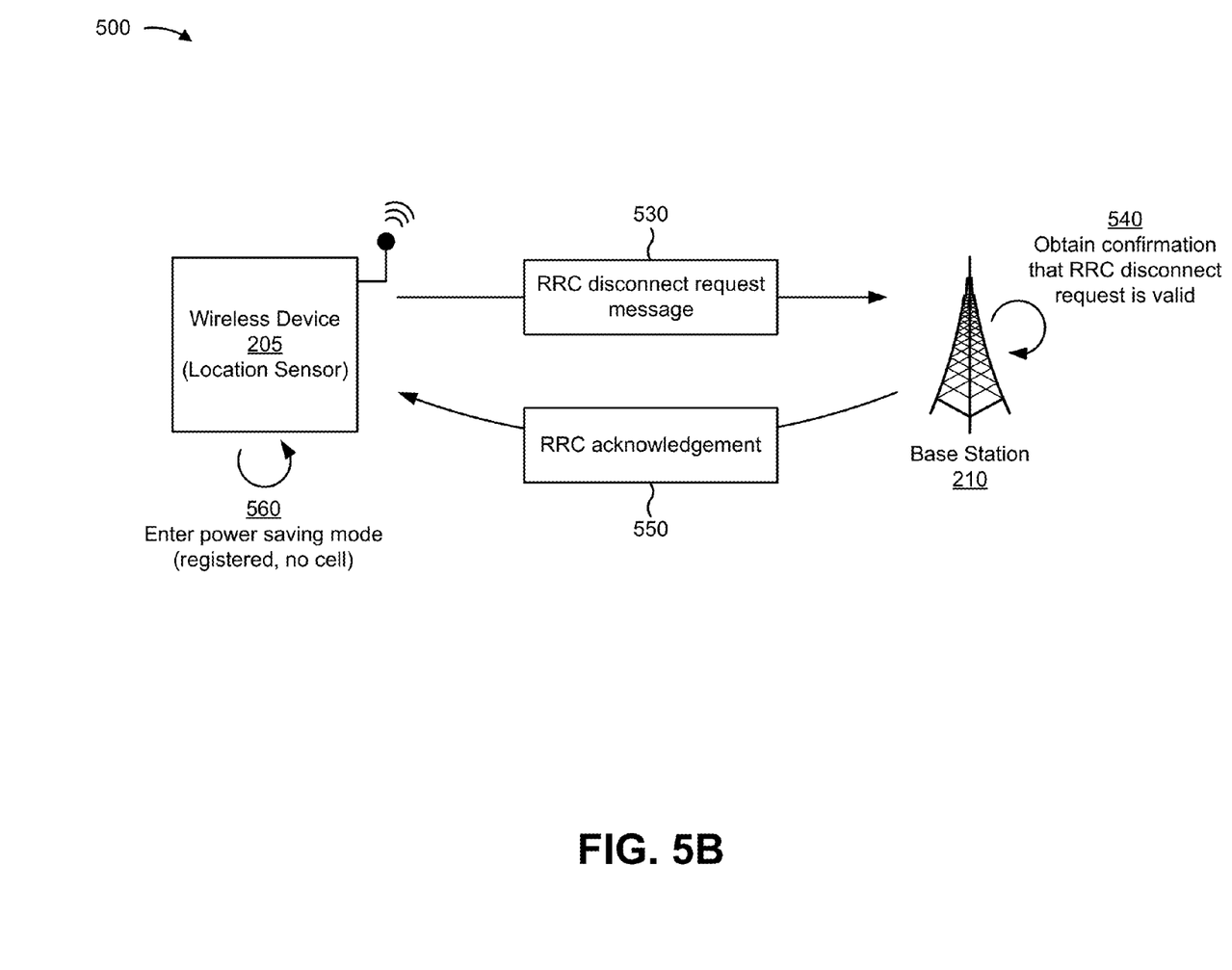
Figure 5C:
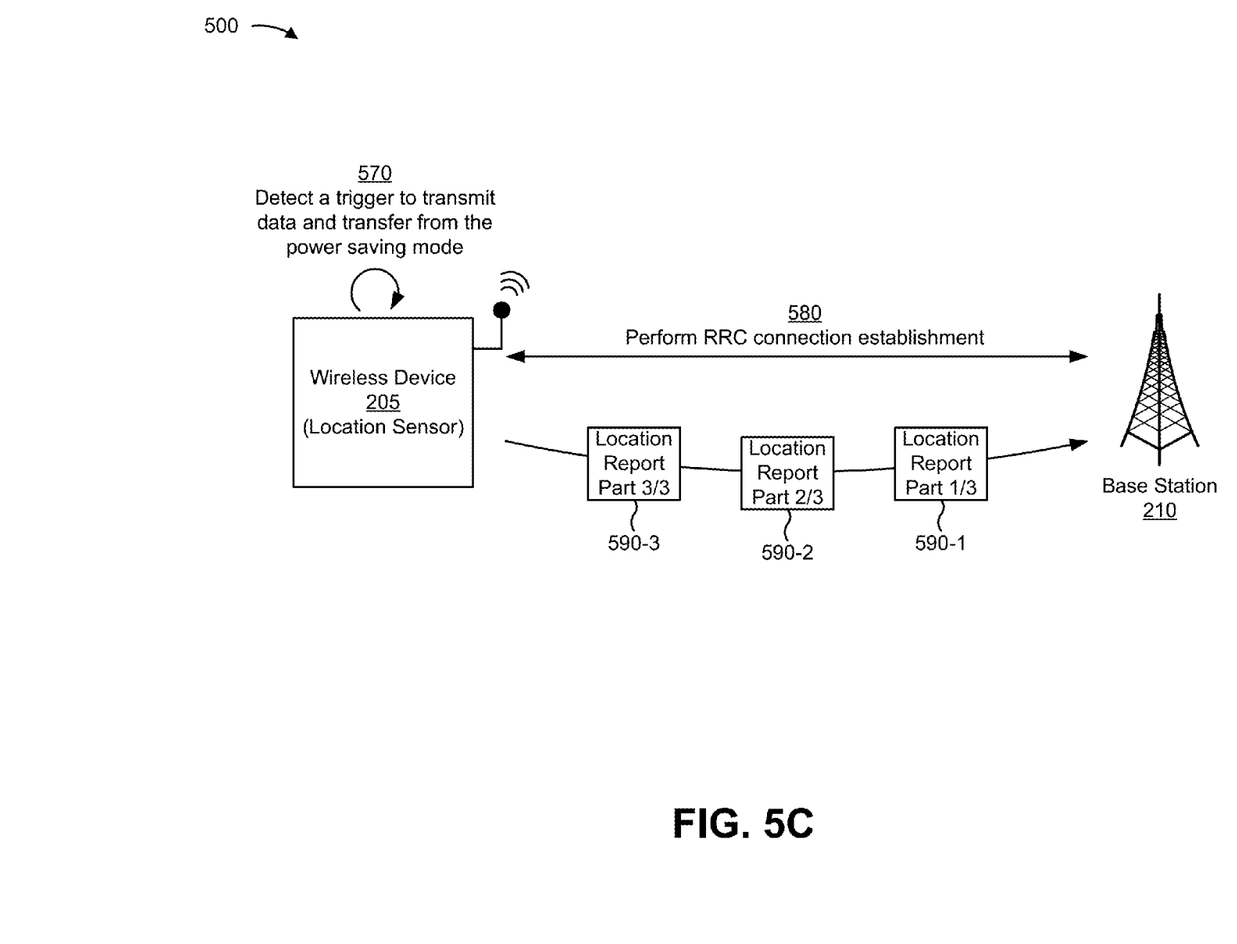

FIGS. 5A-5C are diagrams of an example implementation 500 relating to example process 400 shown in FIG. 4. FIGS. 5A-5C show an example of transferring wireless device 205 to a power saving mode.

As shown in FIG. 5A, wireless device 205 transmits, to base station 210, a location report via a set of packets 510-1, 510-2, and 510-3. For example, wireless device 205 may transmit information identifying a location of wireless device 205 (e.g., a location sensor), thereby permitting tracking of wireless device 205. Assume that the location report is encapsulated by three packets. As shown by reference number 520, after transmitting each packet of the set of packets 510, wireless device 205 determines that a transmission of network traffic is complete.

As shown in FIG. 5B, and by reference number 530, based on determining that the transmission of network traffic is complete, wireless device 205 transmits a request to disconnect from a network (e.g., an RRC disconnect request message) to base station 210 to request permission to disconnect from base station 210 and enter a power saving mode. As shown by reference number 540, wireless device 205 causes, based on transmitting the request message, base station 210 to obtain confirmation that the request message is valid. For example, base station 210 may communicate with MME 215 and/or HSS 230 (not shown) to determine that wireless device 205 is permitted to disconnect from the network and enter the power saving mode without requiring a threshold amount of time to elapse. As shown by reference number 550, wireless device 205 receives, based on base station 210 obtaining the confirmation, an acknowledgement of the request to disconnect (e.g., an RRC acknowledgement message) indicating that wireless device 205 is to enter the power saving mode. As shown by reference number 560, based on receiving the acknowledgement of the request, wireless device 205 enters the power saving mode without requiring a threshold period of inactivity time to expire, thereby reducing a power consumption of wireless device 205 relative to when waiting for the threshold period of inactivity time to expire.

In some implementations, when wireless device 205 enters the power saving mode without requiring a threshold period of inactivity time to expire, wireless device 205 may increase a lifetime of a power source (e.g., a battery, such as a AA battery, a AAA battery, a capacitor, a rechargeable battery, a solar cell, or another type of power source). To illustrate this and merely as an example, assume that the lifetime of the power source, when wireless device 205 remains in an active mode during a threshold period of inactivity time, is determined by an equation as shown below:

$$C_{in} = (T_{nt} * A_{nt}) + (T_{in} * A_{in}) + (T_{psm} * A_{psm});$$

$$(100 \text{ mA} * 10 \text{ ms}) + (5 \text{ mA} * 8 \text{ s}) + (10 \text{ μA} * 3591.99 \text{ s}) = 0.0214 \text{ mAh};$$

where $C_{in}$ represents the total electrical charge when wireless device 205 is remaining in an active mode during a threshold period of inactivity time, $T_{nt}$ represents an amount time for which wireless device 205 is transmitting network traffic (e.g., when wireless device 205 is a location tracker, wireless device 205 may transmit network traffic for 10 milliseconds each hour of a day), $A_{nt}$ represents an electrical current for which wireless device 205 is transmitting network traffic (e.g., when wireless device 205 is a location tracker, wireless device 205 may provide a current of 100 mA when transmitting network traffic), $T_{in}$ represents an amount of time for which wireless device 205 is waiting for a threshold period of inactivity time to expire (e.g., when wireless device 205 is a location tracker, wireless device 205 may wait for the inactivity timer to expire for 8 seconds each hour of a day), $A_{in}$ represents an electrical current for which wireless device 205 is waiting for a threshold period of inactivity time to expire (e.g., when wireless device 205 is a location tracker, wireless device 205 may provide a current of 5 mA when waiting for a threshold of inactivity time to expire), $T_{psm}$ represents an amount of time for which wireless device 205 is in power saving mode (e.g., when wireless device 205 is a location tracker, wireless device 205 may remain in power saving mode for 3591.99 seconds each hour of a day), and $A_{psm}$ represents an electrical current for which wireless device 205 is in power saving mode (e.g., when wireless device 205 is a location tracker, wireless device 205 may provide a current of 10 μA when remaining in power saving mode). Based on determining the total electrical charge when wireless device 205 is remaining in an active mode during a threshold period of inactivity time, the lifetime of the power source may be determined as shown below:

$$L_{B,in} = S_{in}/C_{in};$$

(1000 mA/0.0214 mA*h)=46729 hours=5.3 years;

where $L_{B,in}$ represents the lifetime of a power source (e.g., a AAA battery providing power to a location tracker on a wireless device 205) and $S_{in}$ represents an electrical capacitance of the power source (e.g., the electrical capacitance of a AAA battery has a 1000 mAh).

In some implementations, a location tracker may perform like above but without requiring a threshold period of time to expire. For example, based on not requiring a threshold period of time to expire, the location tracker eliminates the need for an Inactivity Timer and adds the threshold period of time (e.g., eight seconds) to the time of the power saving mode, increasing the time of the power saving mode from 3591.99 seconds to 3599.99 seconds. The lifetime of the power source, when wireless device 205 transfers to the power saving mode without requiring a threshold period of time to expire, may be determined by an equation as shown below:

$$C_{in} = (T_{nt}*A_{nt}) + (T_{in}*A_{in}) + (T_{psm}*A_{psm});$$

(100 mA*10 ms)+(10 µA*3599.99 s)=0.0103 mA;

$$L_{B,in} = S_{in}/C_{in} =$$

(1000 mA/0.0103 mA*h)=97304 hours=11.1 years;

In this case, by not requiring a threshold period of time to expire, wireless device 205 reduces power consumption and increases the lifetime of the power source from 5.3 years to 11.1 years, resulting in more than double the lifetime of the power source of wireless device 205 when remaining in an active mode during a threshold period of inactivity time. During the power saving mode, assume that wireless device 205 remains registered with the network but is not assigned to a cell of the network.

As shown in FIG. 5C, and by reference number 570, wireless device 205 detects a trigger to transmit data and transfer from the power saving mode. For example, wireless device 205 may determine that another location report is to be transmitted. As shown by reference number 580, wireless device 205 and base station 210 perform a connection establishment procedure (e.g., an RRC connection establishment procedure) to reconnect wireless device 205 to the network and permit wireless device 205 to recommence transmitting network traffic. As shown by reference numbers 590-1 through 590-3, based on performing the connection establishment procedure, wireless device 205 transmits a set of packets of another location report.

As indicated above, FIGS. 5A-5C are provided merely as an example. Other examples are possible and may differ from what was described with regard to FIGS. 5A-5C.

Figure 6:
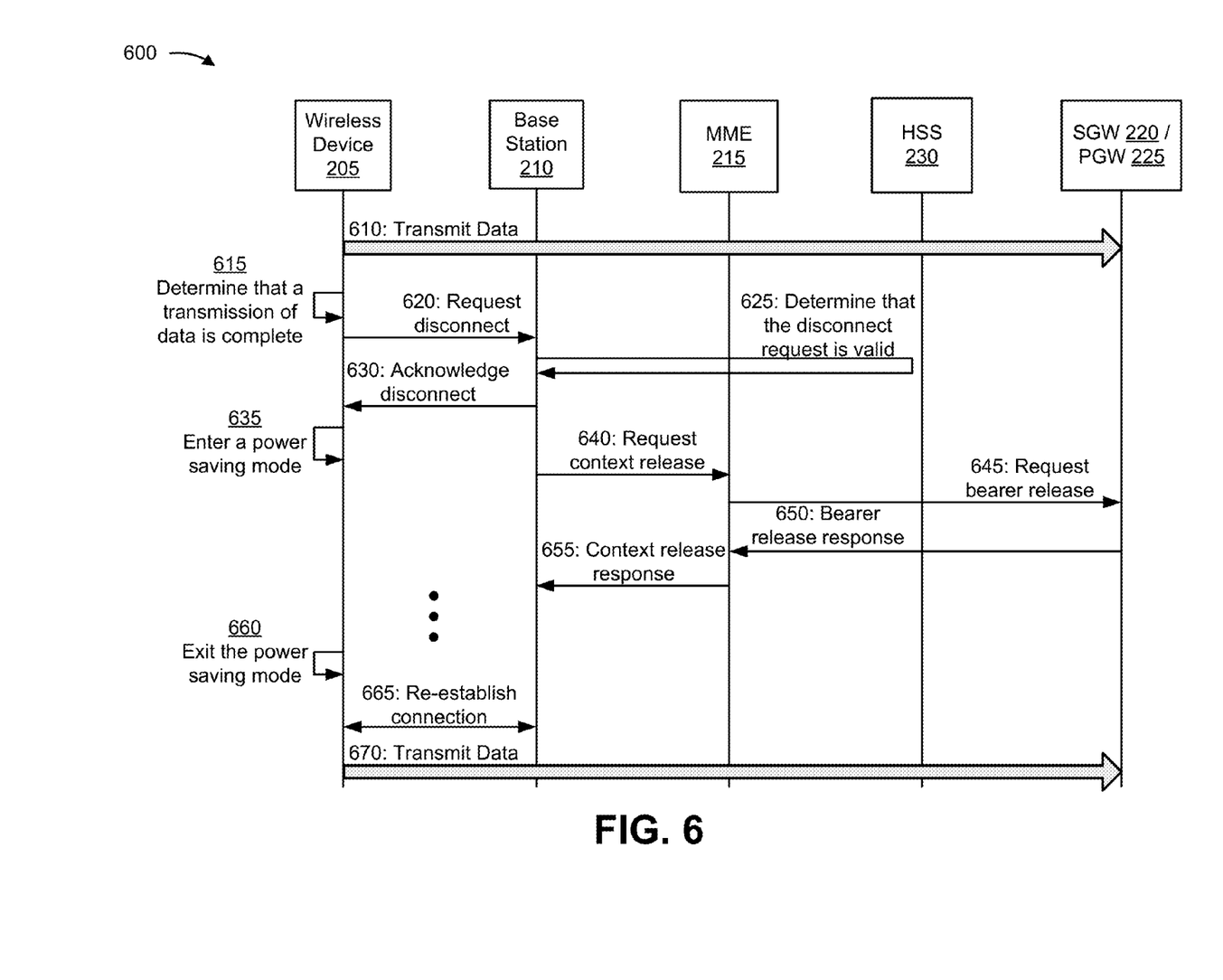
FIG. 6 is a call flow diagram of an example call flow for the example process shown in FIG. 4.

FIG. 6 is a call flow diagram of an example call flow 600 for transferring wireless device 205 to a power saving mode. In some implementations, one or more operations of FIG. 6 may be performed by one or more devices of environment 200.

As shown in FIG. 6, process 600 may include transmitting data (as shown by reference 610). For example, wireless device 205 may transmit network traffic (e.g., data) via a set of packets to SGW 220 and/or PGW 225. As shown by reference number 615, after transmitting data to SGW 220 and/or PGW 225, wireless device 205 may determine that a transmission of network traffic is complete, and may trigger a transfer of wireless device 205 to a power saving mode. For example, wireless device 205 may determine that a set of packets associated with encapsulating a location report have been transmitted, and may determine that another location report is not to be transmitted for a threshold period of time.

As further shown in FIG. 6, process 600 may include transmitting a request to disconnect from a network (as shown by reference 620). For example, based on the trigger to transfer wireless device 205 to the power saving mode, wireless device 205 may transmit, to base station 210, a request to disconnect from base station 210.

As further shown in FIG. 6, process 600 may include determining that the disconnect request is valid (as shown by reference 625). For example, base station 210 may communicate with MME 215 and/or HSS 230 to obtain information indicating that the disconnect request is valid and that wireless device 205 may transfer to the power saving mode.

As further shown in FIG. 6, process 600 may include receiving an acknowledgement of the request to disconnect (as shown by reference 630). For example, wireless device 205 may receive, from base station 210, an acknowledgement of the request to disconnect from base station 210, which may indicate that wireless device 205 is authorized to disconnect from the network.

As further shown in FIG. 6, process 600 may include entering a power saving mode (as shown by reference 635). For example, based on the acknowledgment to disconnect, wireless device 205 may disconnect from base station 210 and transfer to the power saving mode. In this case, wireless device 205 may shut down one or more components of wireless device 205 to transfer to the power saving mode.

As further shown in FIG. 6, process 600 may include transmitting a request for a context release (as shown by reference 640). For example, base station 210 may transmit information to MME 215 indicating a request to release a user equipment (UE) context.

As further shown in FIG. 6, process 600 may include transmitting a request for a bearer to be released (as shown by reference 645). For example, based on MME 215 receiving a request to release the UE context, MME 215 may transmit information to SGW 220 and/or PGW 225 to cause a particular set of bearers allocated to wireless device 205 to be released.

As further shown in FIG. 6, process 600 may include transmitting a response to the request for the bearer to be released (as shown by reference 650). For example, based on SGW 220 and/or PGW 225 receiving a particular request to release a particular set of bearers, SGW 220 and/or PGW 225 may release the particular set of bearers, and may transmit, to MME 215, a particular response to indicate that the particular set of bearers are released. In another example, MME 215 and SGW 220 and/or PGW 225 may cause the particular set of bearers to be reallocated to another wireless device 205 rather than released.

As further shown in FIG. 6, process 600 may include transmitting a response to the request for the context to be released (as shown by reference 655). For example, based on MME 215 receiving an indication that the particular set of bearers are released, MME 215 may transmit, to base station 210, information indicating that a context is to be released. Based on base station 210 receiving the information indicating that the context is to be released, base station 210 may release the context. In this way, wireless device 205 transfers to the power saving mode without requiring a threshold of inactivity time to expire, thereby reducing a rate of power consumption relative to when transmitting data, and a set of network devices (e.g., base station 210, MME 215, HSS 230, and SGW 220 and/or PGW 225) reallocate network resources associated with wireless device 205 based on wireless device 205 transferring to the power saving mode.

As further shown in FIG. 6, process 600 may include exiting the power saving mode (as shown by reference 660). For example, after a period of time (e.g., a threshold period of time associated with triggering another location report to be provided), wireless device 205 may exit the powering saving mode.

As further shown in FIG. 6, process 600 may include performing a connection re-establishment procedure (as shown by reference number 665). For example, wireless device 205 and base station 210 may exchange one or more messages to re-establish the connection based on wireless device 205 exiting a power saving mode. As shown by reference number 670, after re-establishing the connection with base station 210, wireless device 205 may transmit data via a set of packets to SGW 220 and/or PGW 225. In this way, wireless device 205 may return to transmitting data after transferring the power saving mode. Moreover, wireless device 205 may reduce a utilization of power by entering and exiting the power saving mode without requiring a threshold of inactivity time to expire, thereby reducing a rate of power consumption relative to a wireless device that remains in an active mode during periods of time between the transmissions of network traffic.

As indicated above, FIG. 6 is provided merely as an example. Other examples are possible and may differ from what was described with regard to FIG. 6.

In this way, wireless device 205 transfers to a power saving mode without requiring a threshold period of inactivity time to expire, thereby reducing a rate of power consumption relative to when remaining in another mode (e.g., an active mode) during the threshold period of inactivity time. Moreover, based on reducing a rate of power consumption, wireless device 205 reduces a heat dissipation requirement, which improves system stability and longevity, and energy use, which reduces operating and maintenance costs. Furthermore, based on transferring to the power saving mode without requiring the threshold period of inactivity time to expire wireless device 205 doubles the lifetime of a power resource of wireless device 205, as described herein.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, the term packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine that a transmission of network traffic, associated with a wireless device, is complete,
the transmission of network traffic being between the wireless device and a base station associated with a network,
transmit, to the base station associated with the network, a request to disconnect the wireless device from the base station associated with the network based on determining that the transmission of network traffic is complete; and
transfer the wireless device to a power saving mode based on receiving a response, to the request and from the base station associated with the network, that grants permission to disconnect from the base station associated with the network without requiring a threshold period of inactivity time to expire,
the power saving mode being associated with one or more components of the wireless device being shut down.

2. The device of claim 1, where one or more processors are further to:
determine that the transmission of network traffic is associated with a particular quantity of packets;
determine that the particular quantity of packets have been transmitted after determining that the transmission is associated with the particular quantity of packets; and
where the one or more processors, when determining that the transmission of network traffic is complete, are to:
determine that the transmission of network traffic is complete based on determining that the particular quantity of packets have been transmitted.

3. The device of claim 1, where one or more processors are further to:
determine that the transmission of network traffic is associated with a particular period of time;
determine that the particular period of time has elapsed after determining that the transmission of network traffic is associated with the particular period of time; and
where the one or more processors, when determining that the transmission of network traffic is complete, are to:
determine that the transmission of network traffic is complete based on determining that the particular period of time has elapsed.

4. The device of claim 1, where one or more processors, when transmitting the request to disconnect the wireless device from the base station associated with the network, are to:
transmit, via the wireless device, the request to disconnect the wireless device from the base station associated with the network to cause the wireless device to be transferred to the power saving mode.

5. The device of claim 1, where the one or more processors are further to:
receive, based on transmitting the request to disconnect the wireless device from the base station associated with the network, information indicating that the wireless device is permitted to disconnect from the base station associated with the network and enter the power saving mode,
the information being determined based on stored information identifying permissions for a set of wireless devices,
the set of wireless devices including the wireless device; and
where the one or more processors, when transferring the wireless device to the power saving mode, are further to:
transfer the wireless device to the power saving mode based on receiving the information indicating that the wireless device is permitted to disconnect from the base station associated with the network.

6. The device of claim 1, where the one or more processors, when transmitting the request to disconnect the wireless device from the base station associated with the network, are to:
transmit information to cause a context associated with the wireless device to be released and to cause a set of bearers allocated to the wireless device to be released.

7. A non-transitory computer-readable medium storing instructions, the instructions comprising:
one or more instructions that, when executed by one or more processors, cause the one or more processors to:
determine that a transmission of network traffic from a wireless device is complete,
the transmission of network traffic being between the wireless device and a base station associated with a network:
transmit, to the base station associated with the network, a request to disconnect the wireless device from the base station associated with the network based on determining that he transmission of network traffic is complete;
cause the wireless device to be disconnected from the base station associated with the network to enter a power saving mode based on receiving a response, to the request and from the base station associated with the network, that grants permission to disconnect from the base station associated with the network; and
cause the wireless device to shut down one or more components to enter the power saving mode based on causing the wireless device to be disconnected from the base station associated with the network and without requiring a threshold period of inactivity time to expire,
the wireless device causing the one or more components of the wireless device to be shut down.

8. The non-transitory computer-readable medium of claim 7, where the one or more instructions, when executed by the one or more processors, further cause the one or more processors to:
determine that the transmission of network traffic is associated with a particular quantity of packets;
determine that the particular quantity of packets are transmitted after determining that the transmission is associated with the particular quantity of packets; and
where the one or more instructions, that cause the one or more processors to determine that the transmission of network traffic is complete, cause the one or more processors to:
determine that the transmission of network traffic is complete based on determining that the particular quantity of packets are transmitted.

9. The non-transitory computer-readable medium of claim 7, where the one or more instructions, when executed by the one or more processors, further cause the one or more processors to:
  detect a particular user interaction with a user interface associated with causing the transmission of network traffic to be terminated; and
  where the one or more instructions, that cause the one or more processors to determine that the transmission of network traffic is complete, cause the one or more processors to:
    determine that the transmission of network traffic is complete based on detecting the particular user interaction with the user interface.

10. The non-transitory computer-readable medium of claim 7, where the one or more instructions, that cause the one or more processors to cause the wireless device to be disconnected from the base station associated with the network, cause the one or more processors to:
  cause the wireless device to be disconnected from the base station associated with the network within less than eight seconds of determining that the transmission of network traffic is complete.

11. The non-transitory computer-readable medium of claim 7, where the one or more instructions, when executed by the one or more processors, further cause the one or more processors to:
  determine that a threshold period of time has elapsed from transferring the wireless device to the power saving mode; and
  transfer the wireless device from the power saving mode based on determining that the threshold period of time has elapsed.

12. The non-transitory computer-readable medium of claim 11, where the one or more instructions, that cause the one or more processors to transfer the wireless device from the power saving mode, cause the one or more processors to:
  turn on at least one of the one or more components of the wireless device.

13. The non-transitory computer-readable medium of claim 11, where the one or more instructions, that cause the one or more processors to transfer the wireless device from the power saving mode, cause the one or more processors to:
  perform a connection re-establishment procedure,
    the connection re-establishment procedure being associated with re-establishing a connection between the wireless device and the base station associated with the network.

14. A method, comprising:
  determining, by a device, that a transmission of network traffic is complete,
    the transmission of network traffic being between a wireless device and a base station associated with a network,
      the network traffic including data relating to the wireless device; transmitting, by the device, a request to disconnect the wireless device from the base station associated with the network based on determining that the transmission of network traffic is complete,
    the wireless device not being in a power saving mode; and
  transferring, by the device, the wireless device to the power saving mode based on receiving a response, to the request and from the base station associated with the network, that grants permission to disconnect the wireless device from the base station associated with the network,
    the power saving mode being associated with one or more components of the wireless device being shut down,
    the wireless device being transferred to the power saving mode without requiring a threshold period of inactivity time to expire.

15. The method of claim 14, further comprising:
  determining that the transmission of network traffic is associated with a particular period of time;
  determining that the particular period of time has elapsed after determining that the transmission of network traffic is associated with the particular period of time; and
  where determining that the transmission of network traffic is complete comprises:
    determining that the transmission of network traffic is complete based on determining that the particular period of time has elapsed.

16. The method of claim 14, further comprising:
  detecting a particular user interaction with a user interface associated with causing the transmission of network traffic to be terminated; and
  where determining that the transmission of network traffic is complete comprises:
    determining that the transmission of network traffic is complete based on detecting the particular user interaction with the user interface.

17. The method of claim 14, further comprising:
  receiving, based on transmitting the request to disconnect the wireless device from the base station associated with the network, information indicating that the wireless device is permitted to disconnect from the base station associated with the network and enter the power saving mode,
    the information being determined based on stored information identifying a set of permissions for a set of wireless devices,
      the set of wireless devices including the wireless device; and
  where transferring the wireless device to the power saving mode comprises:
    transferring the wireless device to the power saving mode based on receiving the information indicating that the wireless device is permitted to disconnect from the base station associated with the network.

18. The method of claim 14, further comprising:
  transmitting information to cause a context associated with the wireless device to be released.

19. The method of claim 14, further comprising:
  transmitting information to cause a set of bearers allocated to the wireless device to be released.

20. The device of claim 1, where one or more processors are further to:
  determine that a threshold period of time has elapsed since transferring a location report; and
  cause the wireless device to exit the power saving mode based on determining that the threshold period of time has elapsed.

* * * * *